United States Patent
Fu et al.

(10) Patent No.: US 7,523,338 B2
(45) Date of Patent: Apr. 21, 2009

(54) APPARATUS AND METHOD TO SUPPORT USB ENUMERATION OF A BUS POWERED HANDHELD DEVICE

(75) Inventors: Runbo Fu, Kanata (CA); Jonathan Halse, Manotick (CA); Stewart Morris, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 553 days.

(21) Appl. No.: 11/248,430

(22) Filed: Oct. 13, 2005

(65) Prior Publication Data

US 2007/0088967 A1    Apr. 19, 2007

(51) Int. Cl.
G06F 1/00 (2006.01)
G06F 1/32 (2006.01)
G06F 11/30 (2006.01)

(52) U.S. Cl. .................. 713/340; 713/300; 713/320; 713/330

(58) Field of Classification Search ............ 713/340, 713/300, 320, 330
See application file for complete search history.

(56) References Cited

U.S. PATENT DOCUMENTS 5,600,254 A * 2/1997 Berberich ............ 324/711
6,366,143 B1 * 4/2002 Liu et al. ............. 327/142
6,665,801 B1 * 12/2003 Weiss .................. 713/300
7,096,049 B2 * 8/2006 Skinner et al. ......... 455/573

FOREIGN PATENT DOCUMENTS

EP    1487197    12/2004

OTHER PUBLICATIONS

European Search Report dated Jan. 31, 2006.
* cited by examiner

Primary Examiner—Thomas Lee
Assistant Examiner—Michael J Brown
(74) Attorney, Agent, or Firm—Conley Rose, P.C.; J. Robert Brown, Jr.

(57) ABSTRACT

The proposed solution relates to enumeration of a handheld device by a host controller in a laptop, and more particularly to a method and apparatus to support USB enumeration of such a handheld device where greater than 100 mA is required to enumerate the chipset associated with the handheld device. The proposed solution comprises a handheld device with an added USB microcontroller. In operation, the integrated USB microcontroller is only powered up when the USB charging cable is plugged in and the rechargeable battery level is below the threshold required to power up the handheld device with less than 100 mA pre-enumeration USB current. The integrated USB microcontroller performs USB enumeration with the host controller using the pre-enumeration 100 mA current, so that the charging current can be increased to 500 mA post enumeration. Once the rechargeable battery is charged to above the threshold for the handheld device's chipset or when 500 mA current can be drawn from it, the chipset of the handheld device is powered up to take over USB communication from the USB microcontroller.

21 Claims, 8 Drawing Sheets

APPARATUS AND METHOD TO SUPPORT USB ENUMERATION OF A BUS POWERED HANDHELD DEVICE

BACKGROUND

1. Field of Technology

The present application relates to enumeration of a handheld device by a host controller, and more particularly to a method and apparatus to support USB enumeration of such a bus powered handheld device where greater than 100 mA is required to enumerate a main processor associated with the handheld device.

2. Description of the Related Art

As those skilled in the art are aware, a universal serial bus (USB) is a standard port that enables a user to connect USB peripherals (i.e. external devices such as digital cameras, scanners, keyboards, printers, external drives and mice) to a personal computer. The USB Specification Revision 2.0 supports a full-speed signaling bit rate of 12 Mbps (million bits per second). Aside from speed advantages, USB devices can be connected or disconnected without the need to restart the computer, allowing a user to easily attach and detach peripherals. For the above reasons, USB ports have become the industry standard as they are a vast improvement over the serial port standard which preceded them.

In accordance with USB Specification Revision 2.0, the computer to which the USB peripherals are attached includes a host controller which may be a combination of hardware, firmware or software. The host controller is used for: detecting the attachment and removal of USB peripherals; managing control flow between the host controller and the USB peripherals; managing data flow between the host controller and the USB peripherals; and providing power to attached USB devices. As will be appreciated by those in the art, USB devices include "hubs" which provide additional attachment points to the universal serial bus and "functions" such as USB peripherals. The host controller may have integrated therewith a root hub which may connect to other hubs or functions.

In one configuration, a computer (with integral host controller and root hub) connects via a USB port to a handheld communication device (or "function"), such as a cellular phone or a personal digital assistant (PDA), via a vendor-specific adapter. USB handheld charger and sync cables that provide handheld users with a way of charging handheld devices via the USB port on their computer, rather than relying on bulky power adapters and cradles, are known. Data can also be synchronized between the handheld communication device or PDA and the host computer. When a USB peripheral is attached to a powered USB port, the host controller will issue a port enable and reset command to that port. When the port has been enabled, the USB peripheral is now in Default state and can draw no more than 100 mA until it is properly configured. This may be unacceptable for handheld communication devices that may require more than 100 mA to operate.

BRIEF DESCRIPTION OF THE DRAWINGS

A better understanding of the proposed solution which serves to overcome the deficiencies of the prior art will be obtained by considering the detailed description below, with reference to the following drawings in which.

DETAILED DESCRIPTION OF THE DRAWINGS

Figure 1:
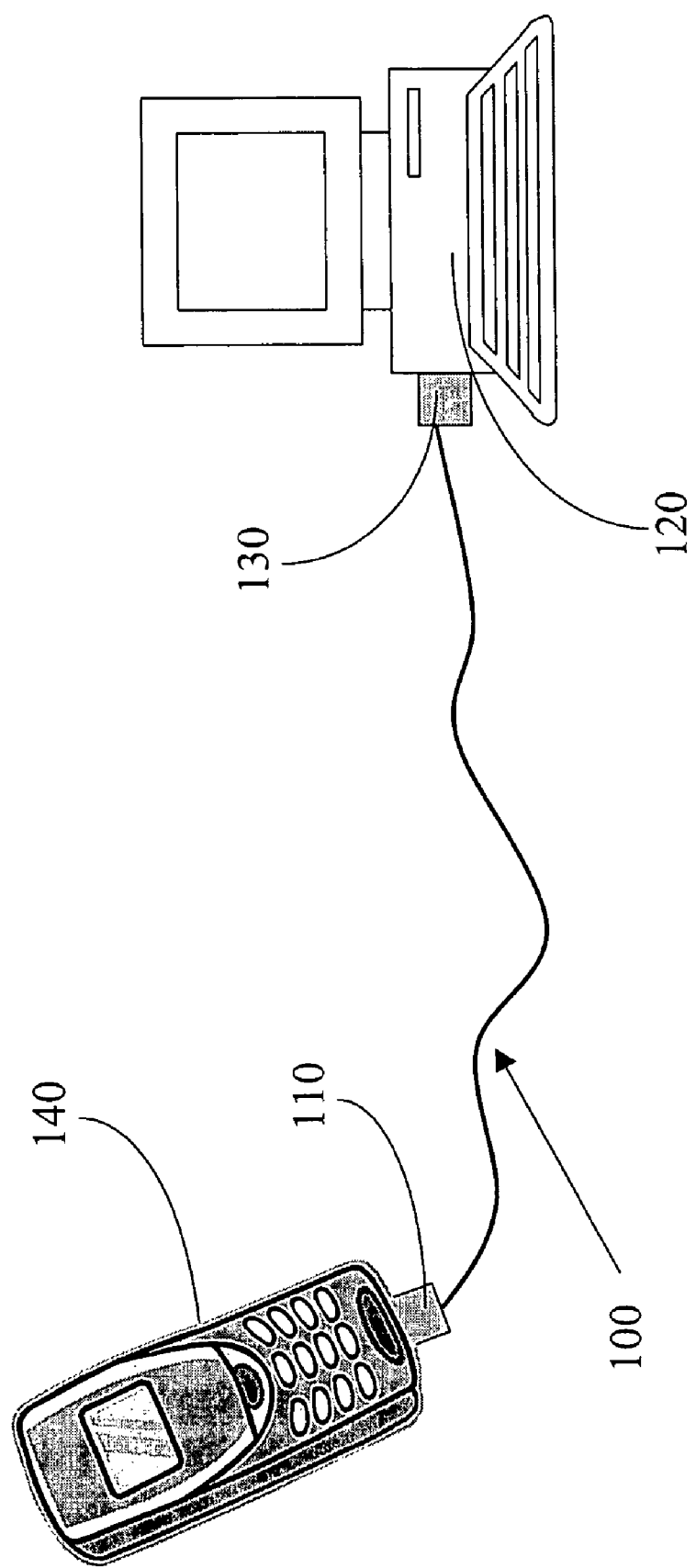
FIG. 1 depicts a USB charging and sync cable connected to a laptop and cellular phone.

According to one aspect of the proposed solution, there is provided: a handheld communication device, wherein said handheld communication device communicates with a remote universal serial bus (USB) host controller via an integrated power and data port, said handheld communication device comprising:(a) a microprocessor communicating with a power management integrated circuit (IC), wherein said microprocessor requires greater than 100 mA to be enumerated with said USB host controller; (b) a multiplexer communicating with at least said integrated power and data port and said power management integrated circuit (IC); (c) a USB charger IC communicating with said USB host controller via said integrated power and data port; (d) a rechargeable battery communicating with said USB charger IC; and (e) a USB microcontroller communicating with said USB host controller via said multiplexer and integrated power and data port, wherein said USB microcontroller requires less than 100 mA to be enumerated with said USB host controller, wherein, if a current available from said rechargeable battery is below a specified threshold required to power up said microprocessor, then said USB microcontroller performs USB enumeration with said USB host controller.

According to another aspect of the proposed solution, there is provided: a method of performing USB enumeration of a handheld communication device communicating with a remote universal serial bus (USB) host controller via an integrated power and data port, wherein said handheld communication device comprises a rechargeable battery and a microprocessor, said method comprising: (a) initiating a connection between said USB host controller and said handheld communication device; and (b) if a current available from said rechargeable battery is below a specified threshold required to power up said microprocessor, then a USB microcontroller performs USB enumeration with said USB host controller, wherein said microprocessor requires greater than 100 mA to be enumerated with said USB host controller, and wherein said USB microcontroller requires less than 100 mA to be enumerated with said USB host controller.

According to yet another aspect of the proposed solution, there is provided: a handheld communication device, wherein said handheld communication device communicates with a remote universal serial bus (USB) host controller via a cable, said handheld communication device comprising: (a) a system processor communicating with a power management integrated circuit (IC) and wherein said system processor requires greater than 100 mA to be enumerated with said USB host controller; (b) a USB hub controller communicating with at least said system processor, wherein said USB hub controller requires less than 100 mA to be enumerated with said USB host controller; (c) a USB charger IC communicating with said USB host controller via said cable; (d) a rechargeable battery communicating with said USB charger IC; and (e) a power management integrated circuit (IC) communicating with said system processor, wherein, if a current available from said rechargeable battery is below a specified threshold required to power up said system processor, then said USB hub controller performs USB enumeration with said USB host controller.

According to yet still another aspect of the present solution, there is provided: a method of performing USB enumeration of a handheld communication device communicating with a remote universal serial bus (USB) host controller via a cable, wherein said handheld communication device comprises a rechargeable battery and a system processor, said method comprising: (a) initiating a connection between said USB host controller and said handheld communication device; and (b) if a current available from said rechargeable battery is below a specified threshold required to power up said system processor, then a USB hub controller performs USB enumeration with said USB host controller, wherein said system processor requires greater than 100 mA to be enumerated with said USB host controller, and wherein said USB hub controller requires less than 100 mA to be enumerated with said USB host controller.

As shown in FIG. 1, USB charger and sync cable 100 comprises a USB connector 110 for connecting to a computer 120, and vendor-specific adaptor 130 for connecting to a handheld device 140. In accordance with USB Specification Revision 2.0, USB charger and sync cable 100 transfers data and power over 4 wires: D− and D+ for data; and $V_{BUS}$ for power and GND for ground.

Figure 2:
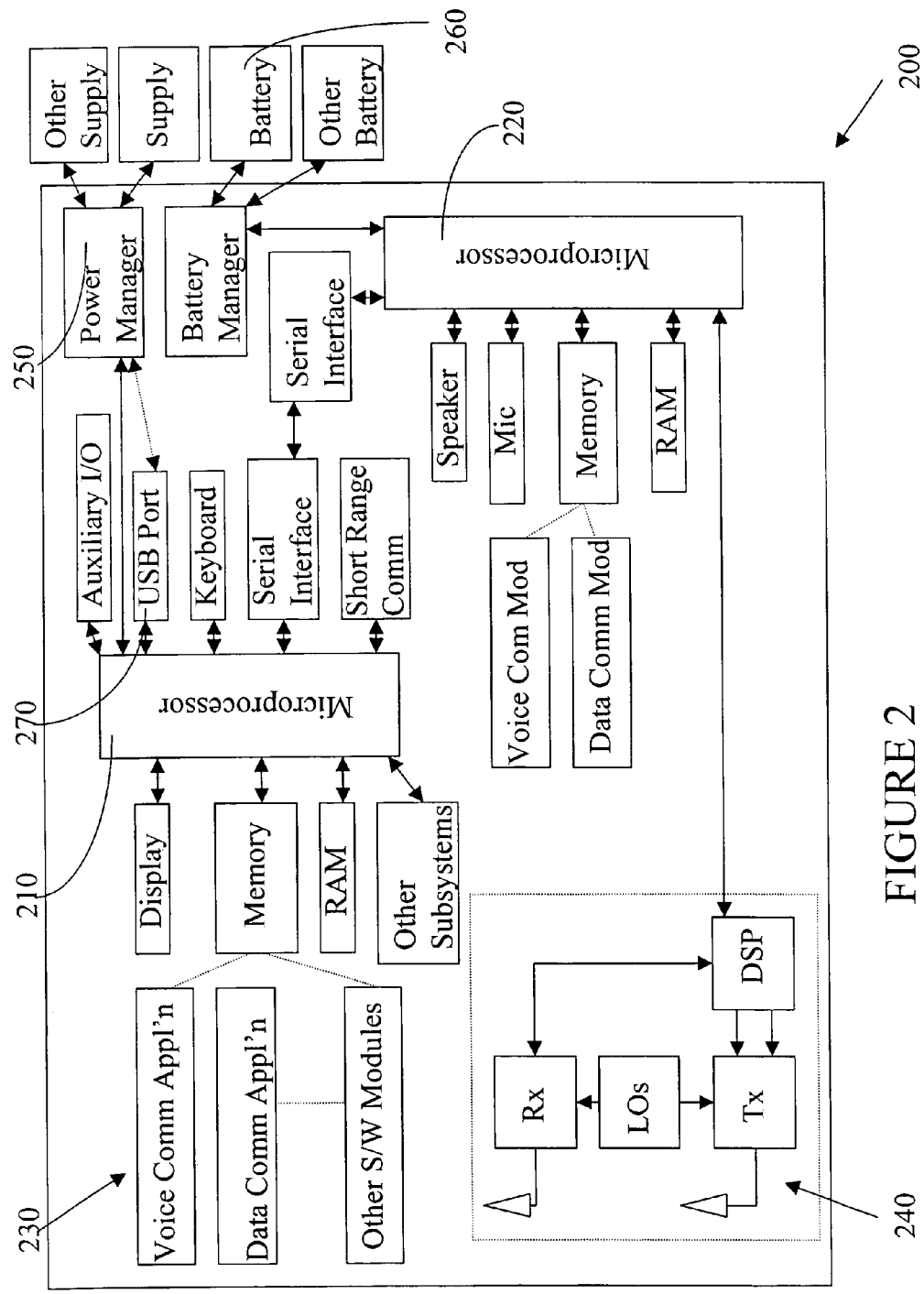
FIG. 2 depicts a block level diagram of a two processor handheld device.

FIG. 2 depicts an exemplary internal configuration 200 of handheld device 140. In the handheld device shown there are two microprocessors 210, 220. Microprocessor 210 is designed to run a variety of applications (shown generally at 230) while microprocessor 220 is designed to run radio transmission/receive functions (shown generally at 240) and power management 250 functions. In operation, rechargeable battery 260 provides power to microprocessors 210, 220 along with other components integral to handheld device 140. In order to lower cost and reduce memory requirements, advanced versions of handheld device 140 may use a single processor, several examples of which are known widely in the art.

When rechargeable battery 260 is dead it can be recharged through USB port 270 using, for example, USB charger and sync cable 100 discussed above. One issue associated with USB charging is that handheld device 140 can draw no more than 100 mA from the USB bus before handheld device 140 is enumerated with the host computer. More specifically, according to USB Specification Revision 2.0, when a USB device ("hub" or "function") is attached to or removed from the universal serial bus, the host controller uses a process known as bus enumeration to identify and manage the device state changes necessary. For example, when a USB peripheral is attached to a powered USB port, the host controller will issue a port enable and reset command to that port. When the port has been enabled, the USB peripheral is now in Default state and can draw no more than 100 mA until it is properly configured. Once the USB peripheral is configured it can draw up to 500 mA if the connected port is a high power port. As a result of the 100 mA restriction, current limiting circuits are included in handheld device 200 to limit the current draw to less than 100 mA. With less than 100 mA current, if rechargeable battery 260 is very low, dead or not inserted there is a good possibility that there is not enough power available to start the chipset of handheld device 140. If the chipset can't be powered up, the enumeration process can't be accomplished. For example, for certain handheld devices 140 with a single processor design, less than 100 mA current can't start the power management chip and the processor. As will be understood by those in the art, the power management integrated circuit (IC) is an essential element of modern low power handheld devices. To be able to maximize the power saving, most handheld processors have their own tightly coupled power management IC designed to work with it together. The power management IC has a group of power switches and regulators to provide power for each section of the handheld device. The processor has software/firmware to turn on and off each power switch and power regulator as required to faciliate normal operation and power saving.

It would be preferable if handheld device 140 configured with a single processor could be powered up under the 100 mA limitation. One approach is to use a separate power supply for the single processor. However, if the power management chip is fully integrated with the single processor, then this solution may not be acceptable due to the complicated power up/power down sequence, power failure handling, power saving management, etc. performed by the power management IC. A solution to address this configuration is therefore required which is relatively inexpensive to implement and which occupies a minimum amount of space within handheld device 140.

In general, the proposed solution detailed in the present application provides, in a first embodiment, a handheld device with an added USB microcontroller. The USB microcontroller has an integrated USB transceiver, microcontroller, RAM, and Flash Memory or EPROM. In the preferred embodiment, the USB microcontroller is an off-the-shelf product, widely used on current USB devices such as USB storage drives, digital cameras, USB mice or the like. The cost of such USB microcontrollers is relatively low and their size is suitable for use in a handheld device. In operation, the integrated USB microcontroller is only powered up when the USB charging and synch cable is plugged in and the rechargeable battery is absent or below the voltage threshold to power up the handheld device with less than 100 mA pre-enumeration USB current. The integrated USB microcontroller performs USB enumeration with the host computer via a USB charging and sync cable, so that the charging current can be increased to 500 mA post enumeration (assuming the handheld device is connected to the high power port) or the host can keep charging the device battery with 100 mA current if the device has a very low or dead battery and the handheld device is connected to a low power port. Once the rechargeable battery is charged to above the threshold for the handheld device chipset or when 500 mA current can be drawn from it, the chipset of the handheld device is powered up to take over USB communication from the USB microcontroller. An alternate embodiment incorporates an integrated USB hub controller. When the USB charging cable is initially plugged in, only the USB hub controller is powered up, thereby requiring much less current to perform the enumeration with the host computer. Once the rechargeable battery level is high enough or it is allowed to draw 500 mA post enumeration, the main processor of the handheld device is started and functions as a device connected to the USB hub controller.

Figure 3:
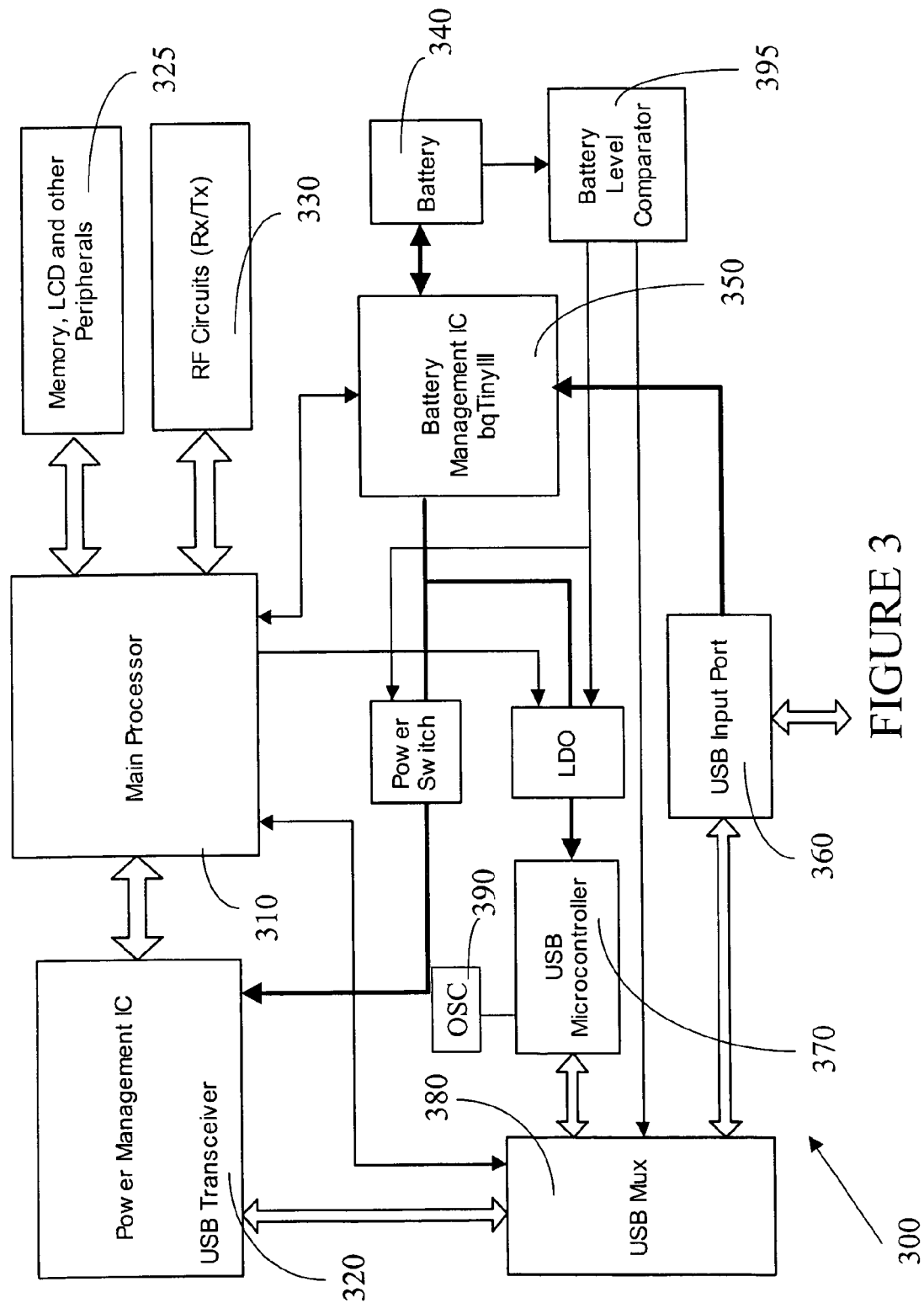
FIG. 3 depicts a first embodiment of the proposed solution incorporating a USB microcontroller.

FIG. 3 depicts the first embodiment of an exemplary internal configuration 300 of handheld device 140 in accordance with the proposed solution. Handheld device 140 is a "function" under USB Specification Revision 2.0. As those in the art will appreciate, "functions" are divided into bus-powered and self-powered classes. Bus-powered functions draw all their power from their USB connection, while self-powered functions draw power from an external power source. Bus-powered functions are further categorized as low-power and high-power. Low-power functions can be powered from either a self-powered or bus-powered "hub", but high-power functions are connected to self-powered hubs in order to have sufficient power to operate. As will be discussed, handheld device 140 can be a bus-powered, low-power function, a bus-powered, high-power function, or a self-powered function depending on the working state of handheld device 140. When battery 340 is absent or when handheld device 300 is in a charging state and the level of battery 340 is below the voltage threshold required to power up handheld device 140, handheld device 140 is a bus-powered, high-power function. Alternately, when handheld device 140 is not connected to a high-power USB port (e.g. port 360), hand-held device 140 can be configured as a bus-powered, low-power function. Finally, when battery 340 of handheld device 140 is fully charged, or when handheld device 140 has turned the charging circuit off, it is a self-powered function.

As can be seen in the drawing, a single processor 310 communicates with a power management integrated circuit (IC) 320 and serves to control not only RF circuits 330 but also a variety of application modules (not shown) and peripherals such as a liquid crystal display (LCD) and memory 325. Rechargeable battery 340 communicates with USB charger integrated circuit 350 which may connect through port 360 to a host controller/hub in a computer via a USB charging and sync cable (not shown). USB charger integrated circuit may, for example, be a bqTINYIII™ Single-Chip Charge and Dynamic Power-Path Management (DPPM) IC offered by Texas Instruments, which allows an AC adapter or USB port connection to simultaneously power the system and recharge battery 340. The bqTINYIII™ also allows for the system to instantaneously turn on from an external power source when rechargeable battery 340 is absent, deeply discharged or dead. As discussed in the background section, this charger IC, starts with an input limiting rate of 100 mA due to the enumeration restriction imposed under USB Specification Revision 2.0, the contents of which are herein incorporated by reference. As also discussed, for certain handheld devices with a single processor design, such as exemplary internal configuration 300, 100 mA is insufficient to start processor 310 and power management IC 320.

Figure 4:
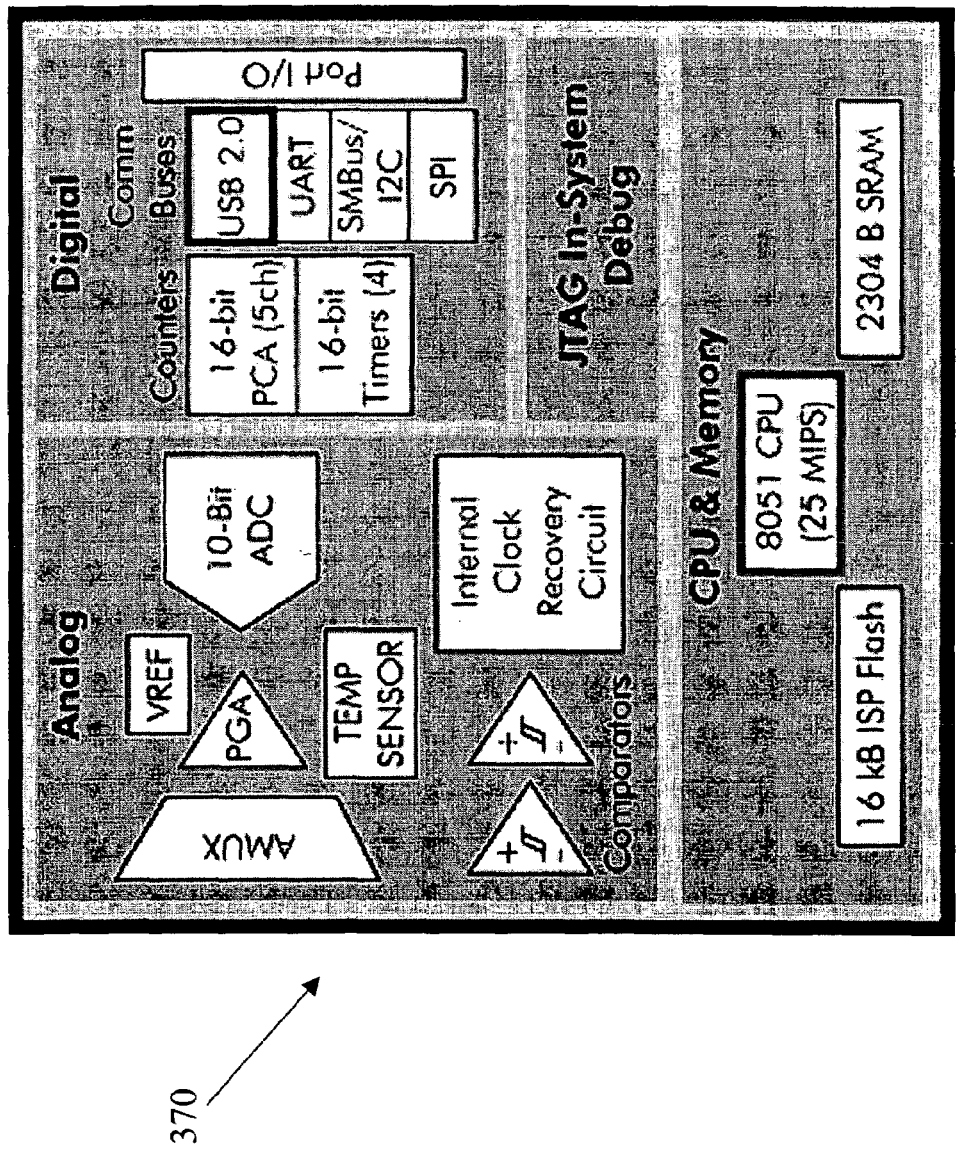
FIG. 4 depicts a typical off-the-shelf USB microcontroller.

In the proposed solution, a USB microcontroller 370 connected through USB multiplexer 380 performs USB enumeration with the host controller/hub integral to the laptop, at less than the 100 mA current draw restriction. As those in the art will appreciate, several off-the-shelf USB microcontrollers 370 are readily available and would perform the required enumeration function adequately. For example, the USB microcontrollers (C8051F320 and C8051F321) offered by Silicon Laboratories would be suitable, a block diagram of which is depicted in FIG. 4. The chip which embodies the USB microcontroller is a tiny 5 mm ×5 mm, 28-pin Micro Lead-Frame Package (MLP); sufficiently small to integrate easily into the circuitry of handheld device 140. Additionally, this chip has an internal oscillator which can be used as the USB clock, although an external oscillator 390 can be used to generate the USB clock. In operation, USB microcontroller 370 is only powered up when the USB charging cable is plugged into port 360 and the level of rechargeable battery 340 is below the threshold to power up handheld device 140 with less than 100 mA pre-enumeration USB current. Essentially, since USB microcontroller 370 can be powered up using less than 100 mA, it fulfills the enumeration function with the host laptop, thereby allowing the charging current to rise to 500 mA post enumeration (in accordance with USB Specification Revision 2.0), sufficient to start the chipset of handheld device 140. Alternately, in the case of a low power USB host, USB microcontroller 370 maintains the USB connection until battery 340 is charged beyond the threshold, sufficient to start the chipset of handheld device 140. Once the chipset is powered up, handheld device 300 takes over USB communication from USB microcontroller 370. USB multiplexer 380 is controlled by USB microcontroller 370 and battery level comparator 395.

In another aspect of this embodiment, the USB microcontroller power supply default is in the ON state. As soon as single processor 310 is powered up, the power supply to USB microcontroller 360 is powered off. This serves to extend the life of rechargeable battery 340, as well as eliminating the complicated inter-processor communication.

Figure 5:
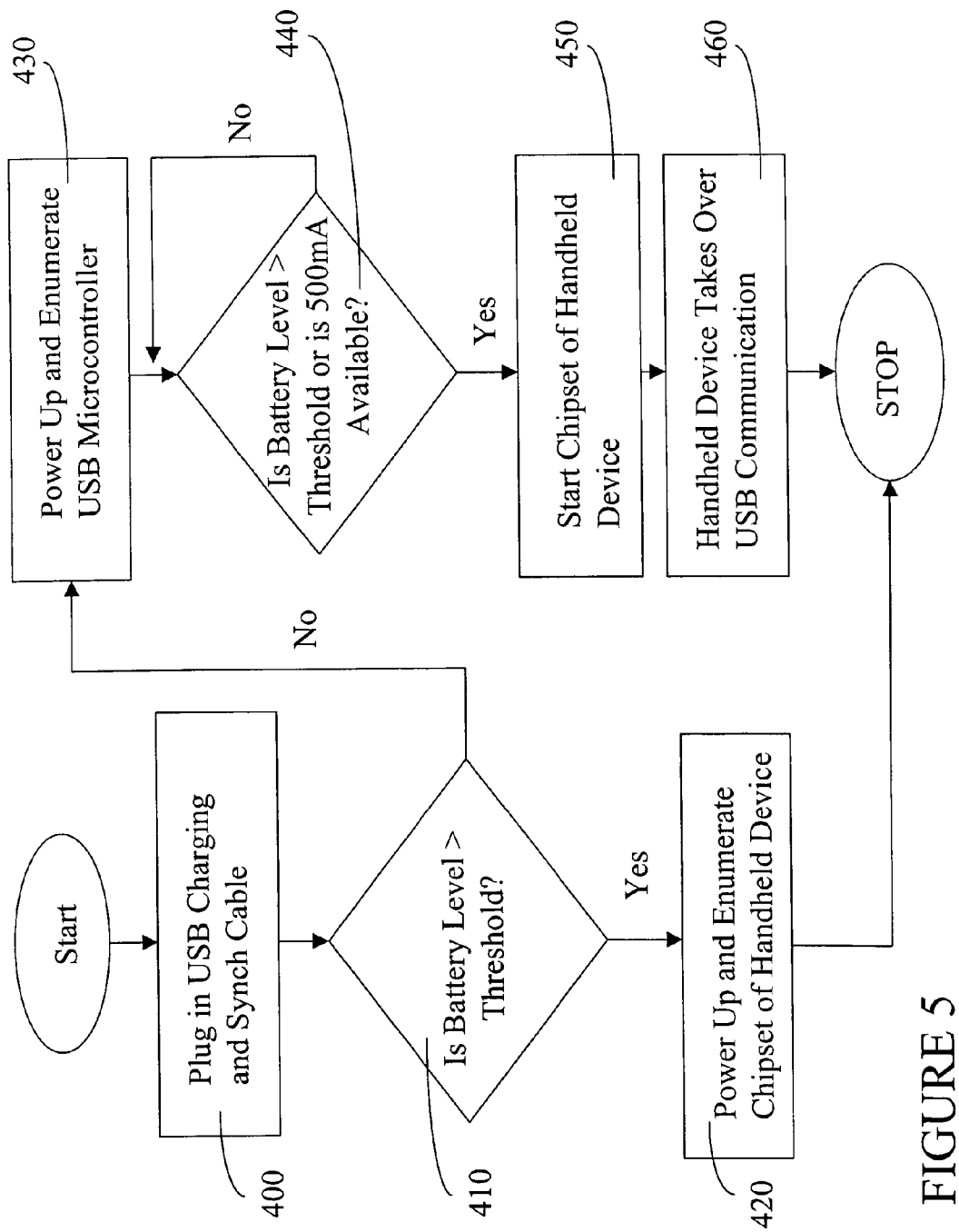
FIG. 5 depicts a flow chart highlighting the steps in the enumeration process using a USB microcontroller.

FIG. 5 depicts a flowchart highlighting the steps in the enumeration process of handheld device 140 having exemplary internal configuration 300. At step 400, the USB charging and synch cable is plugged in. At step 410 it is determined if the level of rechargeable battery 340 is above the threshold to power up handheld device 140 with less than 100 mA pre-enumeration USB current. If yes, then, at step 420, the chipset of handheld device 140 is powered up and handheld device 140 is enumerated. If no, then, at step 430, USB microcontroller 370 is powered up and enumerated using the 100 mA pre-enumeration current. If it is determined at step 440 that the level of rechargeable battery 340 is above the power up threshold for handheld device 140 or when 500 mA current can be drawn, then, at step 450, the chipset of handheld device 140 is started. Once the chipset is started, at step 460, USB communication is taken over by handheld device 140 from USB microcontroller 370.

Figure 6:
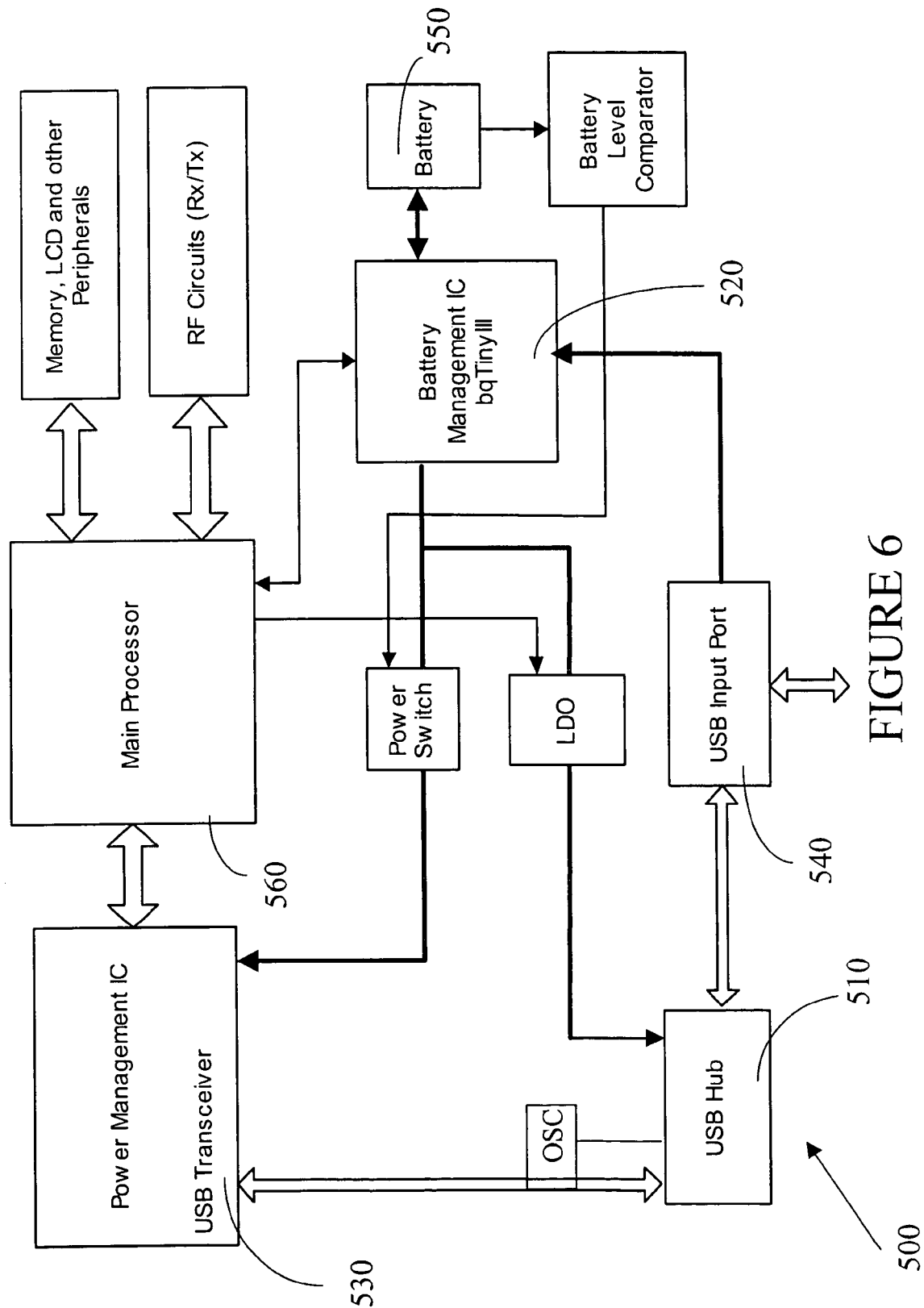
FIG. 6 depicts a second embodiment of the proposed solution incorporating a USB hub controller.

An alternate embodiment of an exemplary internal configuration 500 of handheld device 140 in accordance with the proposed solution is depicted in FIG. 6. In this embodiment a USB hub controller 510 replaces USB microcontroller 370. Handheld device 140 also includes a USB charger IC 520 and power management IC 530 serving similar functions to those previously discussed in relation to FIG. 3. In operation, when the USB charger and synch cable is plugged in at port 540, only USB hub controller 510 is powered up to perform the enumeration with the host computer (not shown). Unlike handheld device 140, USB hub controller 510 requires less than the 100 mA pre-enumeration current available to power up. Once the level of rechargeable battery 550 is high enough or when it is allowed to draw 500 mA current post enumeration, system processor 560 is started and functions as a device of USB hub controller 510.

Figure 7:
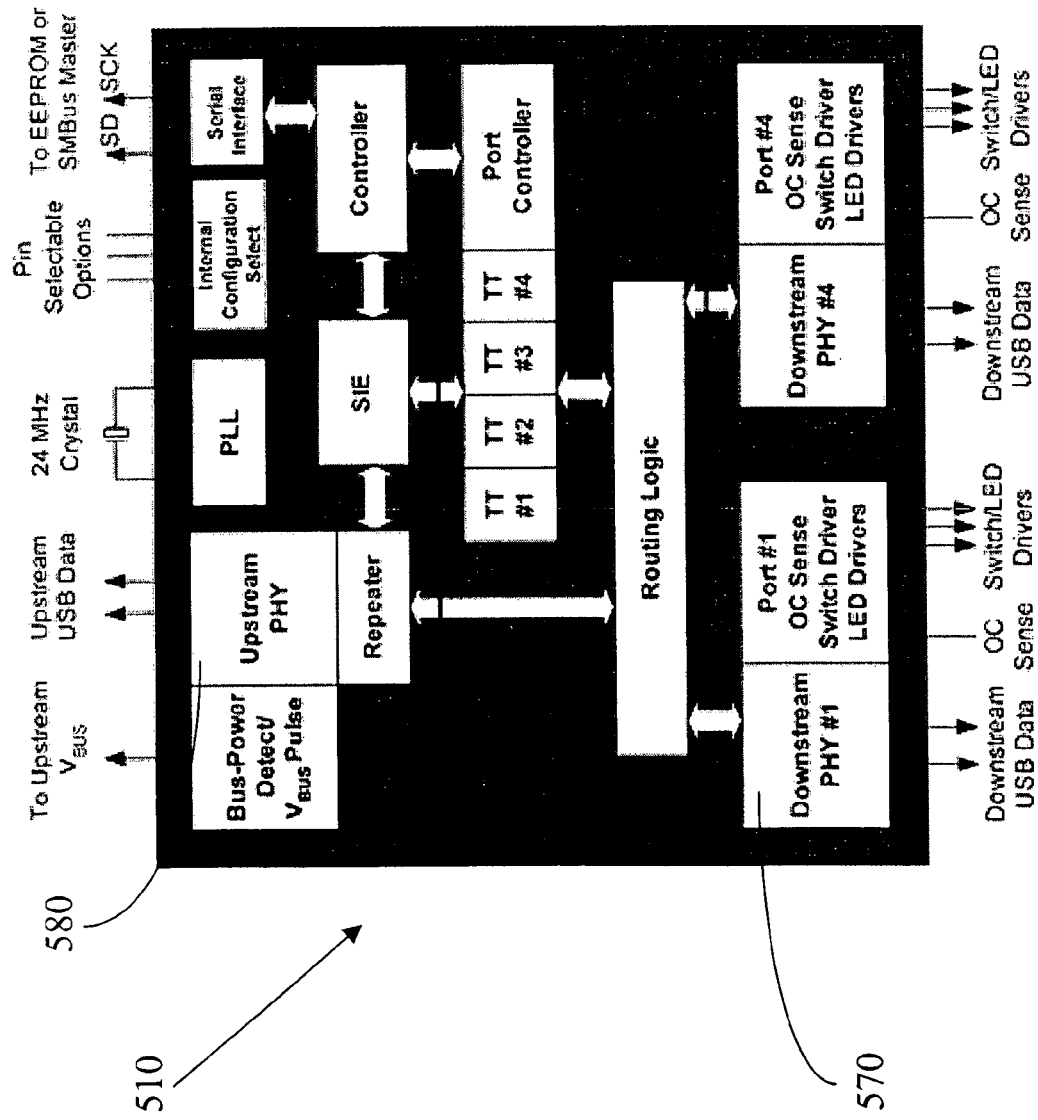
FIG. 7 depicts a typical off-the-shelf USB hub controller.

USB hub controller 510 may also be an off-the-shelf controller designed for handheld devices. One such USB hub controller 510 is the USB20H04 4-Port USB2.0 Hub Controller offered by SMSC, a block diagram of which is depicted at FIG. 7. As previously discussed, in accordance with the USB Specification Revision 2.0, root hub integral to the host laptop can connect to either "hubs" or "functions". Further, hubs, like functions, can be bus-powered or self-powered or a combination thereof. The USB20H04 supports bus-powered, self-powered and dynamic-powered configurations. For self-powered operation, an external supply (e.g. rechargeable battery 550) is used to power the downstream facing ports (shown generally at 570). In bus-powered mode, all power is derived from the upstream facing port 580 (i.e. the USB connection to the host laptop) and no external power supply is required. With dynamic-powered mode, USB20H04 automatically switches to bus-powered mode if a local power source is available. In the preferred embodiment, the dynamic-powered mode allows USB hub controller 510 to be powered by the host laptop to which it is connected during charging of rechargeable battery 550, following which USB hub controller 510 is powered by rechargeable battery 550.

Figure 8:
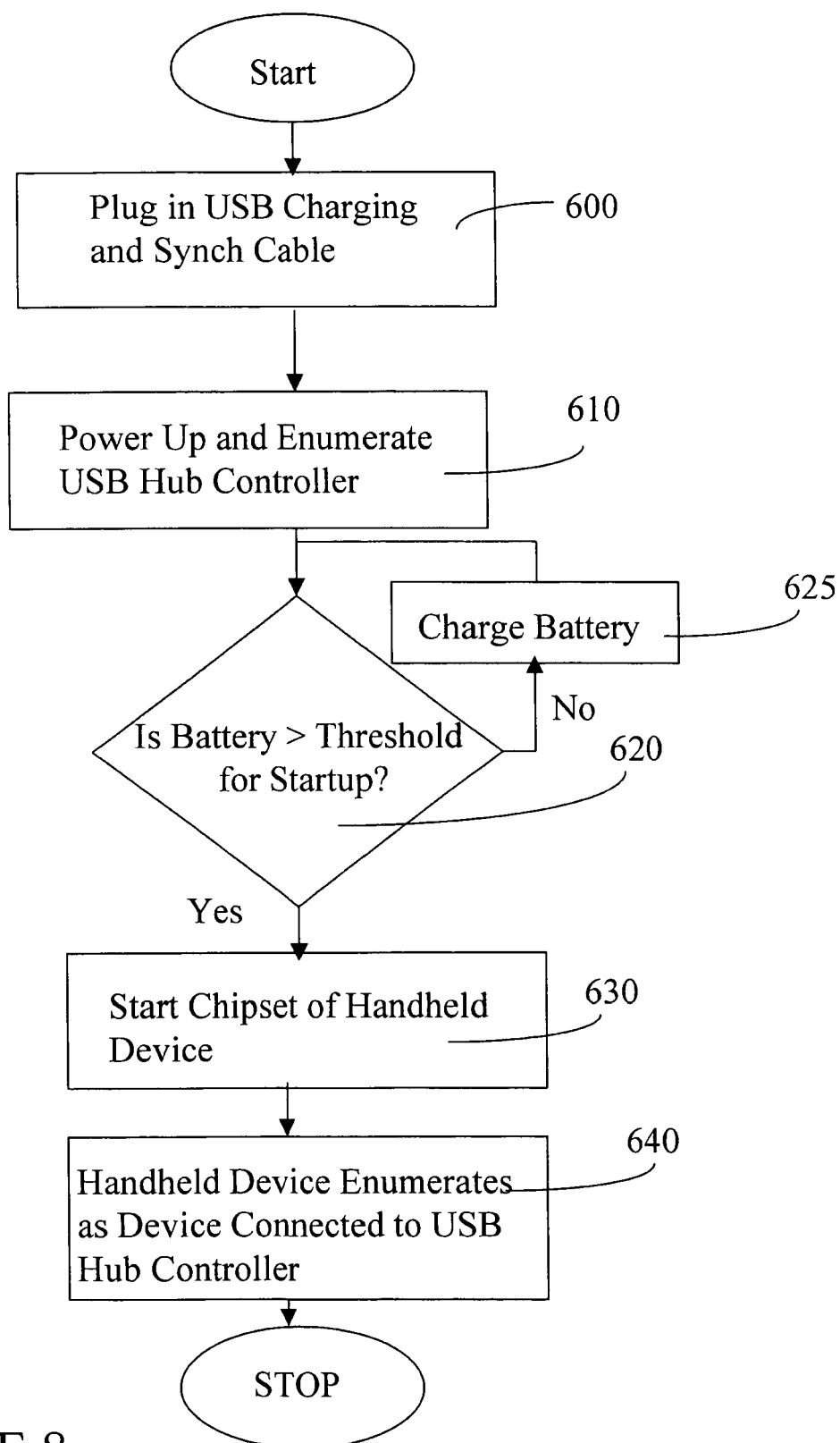
FIG. 8 depicts a flow chart highlighting the steps in the enumeration process using a USB hub controller.

FIG. 8 is a flow chart highlighting the steps in the enumeration process of handheld device 140 having exemplary internal configuration 500. At step 600, the USB charging and synch cable is plugged in. At step 610, USB hub controller 510 is powered up and enumerated using the 100 mA pre-enumeration current. If it is determined at step 620 that the level of rechargeable battery 520 is above the power up threshold for handheld device 140 or when 500 mA current can be drawn, then, at step 630, the chipset of handheld device 140 is started. Once the chipset is started, at step 640, handheld device 140 is enumerated as a device connected to USB hub controller 510. If, at step 620, it is determined that the level of rechargeable battery 520 is not above the power up threshold for handheld device 140 or that 500 mA current cannot be drawn, then at step 625 the battery continues to charge.

The enumeration steps detailed in FIGS. 5 and 8 represent only those which are most applicable to the alternate embodiments of the proposed solution. As will be appreciated by those in the art, the enumeration process includes a number of other steps which are hereinafter defined for the sake of clarity. Generally speaking, before applications can communicate with a device, the host needs to learn about the device and assign a device driver. Enumeration is the initial exchange of information that accomplishes this task. The process includes assigning an address to the device, reading data structures from the device, assigning and loading a device driver, and selecting a configuration, from the options presented in the retrieved data. The device is then configured and ready to transfer data using any of the endpoints in its configuration.

One of the duties of a hub is to detect the attachment and removal of devices. Each hub has an interrupt IN pipe for reporting these events to the host computer. On system boot-up, the host polls its root hub (integral to the computer) to learn if any devices are attached, including additional hubs and devices attached to the first tier of devices. After boot-up, the host continues to poll periodically to learn of any newly attached or removed devices. On learning of a new device, the host sends a series of requests to the device's hub, causing the hub to establish a communications path between the host and the device. The host then attempts to enumerate the device by sending control transfers containing standard USB requests to Endpoint 0. All USB devices must support control transfers, the standard requests, and Endpoint 0. For a successful enumeration, the device must respond to each request by returning the requested information and taking other requested actions. When enumeration is complete, Windows™ adds the new device to the Device Manager display in the Control Panel. When a user disconnects a peripheral, Windows™ automatically removes the device from the display. In a typical peripheral, the device's program code contains the information the host will request, and a combination of hardware and firmware decodes and responds to requests for the information. Some application-specific chips (ASICs) manage the enumeration entirely in hardware and require no firmware support. On the host side, Windows™ handles the enumeration process automatically. Windows™ looks for a special text file called an INF file that identifies the driver to use for the device and then begins the enumeration process.

During the enumeration process, a device moves through four of the six device states defined by the specification: Powered, Default, Address, and Configured. (The other states are Attached and Suspend.) In each state, the device has defined capabilities and behavior. The steps below are a typical sequence of events that occurs during enumeration under Windows™:

(a) The user plugs a device into a USB port or the system powers up with a device already plugged into a port. The port may be on the root hub at the host or attached to a hub that connects downstream of the host (e.g. USB hub controller 510). The hub provides power to the port, and the device is in the Powered state;

(b) The hub detects the device. The hub monitors the voltages on the signal lines of each of its ports. The hub has a 15-kilohm pull-down resistor on each of the port's two signal lines (D+ and D−), while a device has a 1.5-kilohm pull-up resistor on either D+ for a full-speed device or D− for a low-speed device. High-speed devices attach at full speed. When a device plugs into a port, the device's pull-up brings that line high, enabling the hub to detect that a device is attached. On detecting a device, the hub continues to provide power but doesn't yet transmit USB traffic to the device, because the device isn't ready to receive it;

(c) The host learns of the new device. Each hub uses its interrupt pipe to report events at the hub. The report indicates only whether the hub or a port (and if so, which port) has experienced an event. When the host learns of an event, it sends the hub a Get_Port_Status request to find out more. Get_Port_Status and the other requests are standard hub-class requests that all hubs understand. The information returned tells the host when a device is newly attached;

(d) The hub detects whether a device is low or full speed. Just before the hub resets the device, the hub determines whether the device is low or full speed by examining the voltages on the two signal lines. The hub detects the speed of a device by determining which line has the higher voltage when idle. The hub sends the information to the host in response to the next Get_Port_Status request. USB 1.x allowed the hub the option to detect device speed just after reset. USB 2.0 requires speed detection to occur before reset so it knows whether to check for a high-speed-capable device during reset, as described below;

(e) The hub resets the device. When a host learns of a new device, the host controller sends the hub a Set_Port_Feature request that asks the hub to reset the port. The hub places the device's USB data lines in the Reset condition for at least 10 milliseconds. Reset is a special condition where both D+ and D− are a logic low. (Normally, the lines have opposite logic states.) The hub sends the reset only to the new device. Other hubs and devices on the bus don't see it;

(f) The host learns if a full-speed device supports high speed. Detecting whether a device supports high speed uses two special signal states. In the Chirp J state, the D+ line only is driven and in the Chirp K state, the D− line only is driven. During the reset, a device that supports high speed sends a Chirp K. A high-speed hub detects the chirp and responds with a series of alternating Chirp Ks and Js. When the device detects the pattern KJKJKJ, it removes its full-speed pull up and performs all further communications at high speed. If the hub doesn't respond to the device's Chirp K, the device knows it must continue to communicate at full speed. All high-speed devices must be capable of responding to enumeration requests at full speed;

(g) The hub establishes a signal path between the device and the bus. The host verifies that the device has exited the reset state by sending a Get_Port_Status request. A bit in the data returned indicates whether the device is still in the reset state. If necessary, the host repeats the request until the device has exited the reset state. When the hub removes the reset, the device is in the Default state. The device's USB registers are in their reset states and the device is ready to respond to control transfers over the default pipe at Endpoint 0. The device can now communicate with the host, using the default address of 00h. The device can draw up to 100 milliamperes from the bus;

(h) The host sends a Get_Descriptor request to learn the maximum packet size of the default pipe. The host sends the request to device address 0, Endpoint 0. Because the host enumerates only one device at a time, only one device will respond to communications addressed to device address 0, even if several devices attach at once. The eighth byte of the device descriptor contains the maximum packet size supported by Endpoint 0. A Windows™ host requests 64 bytes, but after receiving just one packet (whether or not it has 64 bytes), it begins the status stage of the transfer. On completion of the status stage, a Windows™ host requests the hub to reset the device (step (e)). The specification doesn't require a reset here, because devices should be able to handle the host's abandoning a control transfer at any time by responding to the next Setup packet. But resetting is a precaution that ensures that the device will be in a known state when the reset ends;

(i) The host assigns an address. The host controller assigns a unique address to the device by sending a Set_Address request. The device reads the request, returns an acknowledge, and stores the new address. The device is now in the Address state. All communications from this point on use the new address. The address is valid until the device is detached or reset or the system powers down. On the next enumeration, the device may be assigned a different address;

(j) The host learns about the device's abilities. The host sends a Get_Descriptor request to the new address to read the device descriptor, this time reading the whole thing. The descriptor is a data structure containing the maximum packet size for Endpoint 0, the number of configurations the device supports, and other basic information about the device. The host uses this information in the communications that follow. The host continues to learn about the device by requesting the one or more configuration descriptors specified in the device descriptor. A device normally responds to a request for a configuration descriptor by sending the descriptor followed by all of that descriptor's subordinate descriptors. But a Windows host begins by requesting just the configuration descriptor's nine bytes. Included in these bytes is the total length of the configuration descriptor and its subordinate descriptors. Windows then requests the configuration descriptor again, this time using the retrieved total length, up to FFh bytes. This causes the device to send the configuration descriptor followed by the interface descriptor(s) for each configuration, followed by endpoint descriptor(s) for each interface. If the descriptors total more than FFh bytes, Windows™ obtains the full set of descriptors on a third request. Each descriptor begins with its length and type, to enable the host to parse (pick out the individual elements) in the data that follows;

(k) The host assigns and loads a device driver (except for composite devices). After the host learns as much as it can about the device from its descriptors, it looks for the best match in a device driver to manage communications with the device. In selecting a driver, Windows™ tries to match the information stored in the system's INF files with the Vendor and Product IDs and (optional) Release. Number retrieved from the device. If there is no match, Windows™ looks for a match with any class, subclass, and protocol values retrieved from the device. After the operating system assigns and loads the driver, the driver often requests the device to resend descriptors or send other class-specific descriptors. An exception to this sequence is composite devices, which have multiple interfaces, with each interface requiring a driver. The host can assign these drivers only after the interfaces are enabled, which requires the device to be configured (as described in the next step);

(l) The host's device driver selects a configuration. After learning about the device from the descriptors, the device driver requests a configuration by sending a Set Configuration request with the desired configuration number. Many devices support only one configuration. If a device supports multiple configurations, the driver can decide which to use based on whatever information it has about how the device will be used, or it may ask the user what to do, or it may just select the first configuration. The device reads the request and sets its configuration to match. The device is now in the Configured state and the device's interface(s) are enabled.

The host now assigns drivers for the interfaces in composite devices. As with other devices, the host uses the information retrieved from the device to find a matching driver. The device is now ready for use.

The advantage of the proposed solution is now readily apparent. Using either the USB microcontroller or the USB hub controller the chipset of a handheld device can be started even where the handheld device can draw no more than 100 mA before the handheld device is enumerated with the computer host.

A person understanding the proposed solution may now conceive of alternative structures and embodiments or variations of the above all of which are intended to fall within the scope of the proposed solution as defined in the claims that follow.

We claim:

1. A handheld communication device, wherein said handheld communication device (300) communicates with a remote universal serial bus (USB) host controller via an integrated power and data port, said handheld communication device comprising:
   (a) a microprocessor communicating with a power management integrated circuit (IC), wherein said microprocessor requires greater than 100 mA to be enumerated with said USB host controller;
   (b) a multiplexer communicating with at least said integrated power and data port and said power management integrated circuit (IC);
   (c) a USB charger IC communicating with said USB host controller via said integrated power and data port;
   (d) a rechargeable battery communicating with said USB charger IC; and
   (e) a USB microcontroller communicating with said USB host controller via said multiplexer and integrated power and data port; wherein said USB microcontroller requires less than 100 mA to be enumerated with said USB host controller,
   wherein, if a current available from said rechargeable battery is below a specified threshold required to power up said microprocessor, then said USB microcontroller performs USB enumeration with said USB host controller.

2. The handheld communication device of claim 1, wherein said integrated power and data port releasably connects to a device-specific adapter integral to a proximate end of a USB charging and sync cable, and wherein a distal end of said USB charging and sync cable comprises a standard USB connector for releasably connecting to said USB host controller.

3. The handheld communication device of claim 1 wherein said USB hub controller is housed in a personal computer.

4. The handheld communication device of claim 1, wherein if said current available from said rechargeable battery is above said specified threshold, then said microprocessor is enumerated by said USB host controller.

5. The handheld communication device of claim 1 wherein, upon connection of said USB charging and sync cable to said integrated power and data port, said rechargeable battery receives current via said USB charger IC, and wherein, following USB enumeration, if said current available from said rechargeable battery is above said specified threshold, then said microprocessor is powered up by said rechargeable battery.

6. The handheld communication device of claim 5 wherein, upon power up, said USB microcontroller is powered off.

7. The handheld communication device of claim 6 wherein, after said USB microcontroller is powered off, said microprocessor communicates with said USB host controller.

8. A method of performing USB enumeration of a handheld communication device communicating with a remote universal serial bus (USB) host controller via an integrated power and data port, wherein said handheld communication device comprises a rechargeable battery and a microprocessor, said method comprising:
   (a) initiating a connection between said USB host controller and said handheld communication device; and
   (b) if a current available from said rechargeable battery is below a specified threshold required to power up said microprocessor, then a USB microcontroller performs USB enumeration with said USB host controller,
   wherein said microprocessor requires greater than 100 mA to be enumerated with said USB host controller,
   and wherein said USB microcontroller requires less than 100 mA to be enumerated with said USB host controller.

9. The method of claim 8 wherein said step of initiating comprises connecting a USB charging and sync cable from said integrated power and data port to a standard USB connector associated with a laptop housing said USB host controller.

10. The method of claim 8 wherein, if said current available from said rechargeable battery is above said specified threshold, then said microprocessor is enumerated by said USB host controller.

11. The method of claim 8 further comprising, following USB enumeration, charging said rechargeable battery.

12. The method of claim 11 wherein, if said current available from said rechargeable battery is above said specified threshold, then said microprocessor is powered up by said rechargeable battery.

13. The method of claim 12 further comprising, following powering up of said microprocessor, powering off said USB microcontroller.

14. The method of claim 13 further comprising, following power off of said USB microcontroller, said microprocessor communicating with said USB host controller.

15. A handheld communication device, wherein said handheld communication device communicates with a remote universal serial bus (USB) host controller via a cable, said handheld communication device comprising:
   (a) a system processor communicating with a power management integrated circuit (IC) and wherein said system processor requires greater than 100 mA to be enumerated with said USB host controller;
   (b) a USB hub controller communicating with at least said system processor, wherein said USB hub controller requires less than 100 mA to be enumerated with said USB host controller;
   (c) a USB charger IC communicating with said USB host controller via said cable;
   (d) a rechargeable battery communicating with said USB charger IC; and
   (e) the power management integrated circuit (IC) communicating with said system processor,
   wherein, if a current available from said rechargeable battery is below a specified threshold required to power up said system processor, then said USB hub controller performs USB enumeration with said USB host controller.

16. The handheld communication device of claim 15 wherein said cable is a USB charging and sync cable, and wherein said rechargeable battery receives current via said USB charger IC, and wherein, following USB enumeration, if said current available from said rechargeable battery is above said specified threshold, then said system processor is powered up by said rechargeable battery.

17. The handheld communication device of claim 15 wherein, following power up, said system processor enumerates as a device connected to said USB hub controller.

18. A method of performing USB enumeration of a handheld communication device communicating with a remote universal serial bus (USB) host controller via a cable,
   wherein said handheld communication device comprises a rechargeable battery and a system processor, said method comprising:
   (a) initiating a connection between said USB host controller and said handheld communication device; and
   (b) if a current available from said rechargeable battery is below a specified threshold required to power up said system processor, then a USB hub controller performs USB enumeration with said USB host controller,
   wherein said system processor requires greater than 100 mA to be enumerated with said USB host controller,
   and wherein said USB hub controller requires less than 100 mA to be enumerated with said USB host controller.

19. The method of claim 18 wherein said cable is a USB charging and sync cable, and wherein said step of initiating comprises connecting said USB charging and sync cable to a standard USB connector associated with a laptop housing said USB host controller.

20. The method of claim 19 further comprising, following USB enumeration, charging said rechargeable battery, wherein, if said current available from said rechargeable battery is above said specified threshold, then said system processor is powered up by said rechargeable battery.

21. The method of claim 19 further comprising, following power up, said system processor communicating with said USB hub controller.

* * * * *